US006161848A

United States Patent [19]

Beumer et al.

[11] Patent Number: 6,161,848

[45] Date of Patent: Dec. 19, 2000

[54] ASSEMBLY OF NESTABLE WHEELCHAIRS AND WHEELCHAIR FOR USE IN SUCH AN ASSEMBLY

[75] Inventors: Stephanus Theodorus Anthonius Gertrudes Beumer, Gendringen; Anton Hendrikus Beumer, Silvolde, both of Netherlands

[73] Assignee: Revab B.V., Netherlands

[21] Appl. No.: 09/155,344

[22] PCT Filed: Mar. 26, 1997

[86] PCT No.: PCT/NL97/00153

§ 371 Date: Mar. 12, 1999

§ 102(e) Date: Mar. 12, 1999

[87] PCT Pub. No.: WO97/35536

PCT Pub. Date: Oct. 2, 1997

[30] Foreign Application Priority Data

Mar. 26, 1996 [NL] Netherlands .......................... 1002714

[51] Int. Cl.[7] ...................................................... B62D 39/00

[52] U.S. Cl. ......................................................... 280/33.991

[58] Field of Search ......................... 280/33.991, 33.992, 280/33.993, 33.994, 33.996, 657, 658, 47.38, 47.41; 297/239, 236, 326, 332, 335, DIG. 4

[56] References Cited

U.S. PATENT DOCUMENTS

| | | | |
|---|---|---|---|
| 2,962,292 | 11/1960 | Edmonston | 280/33.99 |
| 5,090,517 | 2/1992 | Doughty | 188/19 |
| 5,149,115 | 9/1992 | Sampedro | 280/33.998 |
| 5,277,473 | 1/1994 | Kelly et al. | 297/250.1 |
| 5,288,089 | 2/1994 | Bowers et al. | 280/33.994 |
| 5,354,079 | 10/1994 | Hettenbach | 280/33.991 |

FOREIGN PATENT DOCUMENTS

| | | |
|---|---|---|
| 0 356 084 | 2/1990 | European Pat. Off. . |

*Primary Examiner*—Kevin Hurley
*Assistant Examiner*—Kevin McKinley
*Attorney, Agent, or Firm*—Michaelson & Wallace; Peter L. Michaelson

[57] ABSTRACT

Assembly of at least two wheelchairs, each provided with at least three wheels, a frame and a sitting support, wherein the wheelchairs are nestable, in such a manner that the wheelchairs in a nested condition occupy considerably less space than in unnested condition, while the wheelchairs upon being unnested are substantially directly ready for use, and an assembly wherein two wheelchairs in the assembly in nested condition occupy a floor area, preferably a floor area which is at most 90%, preferably less than 75% and in particular less than 60% of the floor surface occupied by the same two wheelchairs in unnested condition.

17 Claims, 7 Drawing Sheets

ASSEMBLY OF NESTABLE WHEELCHAIRS AND WHEELCHAIR FOR USE IN SUCH AN ASSEMBLY

The invention relates to an assembly of a number of wheelchairs according to the preamble of claim 1. Such an assembly is known from practice and is supplied by the firm of Revab BV, Silvolde, the Netherlands.

The known assembly is used, for instance, at airports, in hospitals and nursing homes, department stores and like establishments visited by varying populations. The wheelchairs are intended for public or at least semipublic use. The use of such an assembly will now be explained with reference to an airport.

At any moment of the day, a number of wheelchairs are arranged together at a central point, for instance at an entrance of an airport. A passenger arriving at the airport sits down in one of the wheelchairs, with or without assistance from, for instance, a fellow traveler or an airport employee. Then the user of the wheelchair proceeds to an airplane, where the wheelchair is left behind when the user takes his seat in the airplane. The wheelchair may be used again by another passenger for another displacement or is wheeled back empty to the above-mentioned or similar central point in due course.

The known assembly of wheelchairs has as a disadvantage that the wheelchairs occupy a great deal of space in unused condition. The wheelchairs are placed together, for instance in a row side by side. It will be clear that this is undesirable, since space at an airport but also in, for instance, hospitals, residences for disabled or older people and the like, is limited. Moreover, the wheelchairs arranged together make a disorderly, chaotic and hence unattractive impression and can be a hindrance and even dangerous to other passers-by, such as visitors and employees. A further disadvantage is that the wheelchairs, when they are not, or no longer, in use and have been left at a different point than the above-mentioned central arrangement point, they have to be returned to that central arrangement point one by one, which is time-consuming and strenuous, and hence expensive and unpleasant.

It has previously been proposed to make wheelchairs collapsible, so that in the condition where they are not used they take up little or at least less space than in a service position. This is undesirable for wheelchairs for public or at least semipublic use, since the wheelchairs are not ready for use in such a storage position. An intended user or helper must then first unfold the wheelchair or at least make is ready for use, whereafter it can be used. This is undesirable, notably in places where time is limited. Moreover, making such a wheelchair ready for use is not easy. It requires some skill, which is not always present. Furthermore, such a wheelchair has the disadvantage that it has to be collapsed again after use, mostly by employees, which is economically and ergonomically undesirable. Moreover, these wheelchairs too can only be returned to the central arrangement point one by one.

The object of the invention is to provide an assembly of the type described in the preamble of the main claim, which obviates at least the disadvantages mentioned, while maintaining the advantages thereof. To that end, an assembly according to the invention is characterized by the features of the characterizing portion of claim 1.

'Nesting' is herein understood to mean the positioning of wheelchairs relative to each other in such a manner that the wheelchairs in an at least substantially ready-for-use condition are at least partly slid into each other with a proper fit.

The area occupied by the joint wheelchairs viewed in vertical projection is then considerably smaller in the nested condition than in the unnested condition. In the nested condition, the wheelchairs can all rest on their own wheels or wholly or partly on each other.

Since in the nested condition the wheelchairs take up less floor space than in unnested condition, a great deal of space is gained by at least temporarily storing the wheelchairs, while the wheelchairs in the nested condition moreover give a tidy, neat impression. What is prevented in that the wheelchairs are stored in a substantially or entirely ready-for-use condition is that a user, prior to use, first has to make the wheelchair to be used by him or her ready for use himself, for instance by unfolding it or by assembling parts, or must have this performed by his attendant(s) or other helpers. Thus a gain of time and serviceability are obtained for the user, while moreover for the benefit of the user his dependency on others is largely or entirely removed. During use a user, or possibly a helper or attendant, can simply unnest one of the wheelchairs, whereafter the user can directly sit down on the sitting support. After use the wheelchair is brought back into the nested position and is ready for use by a next or possibly the same user at a later time. A further advantage of an assembly according to the invention is that the risk that users and passers-by sustain injury from the nested wheelchairs is considerably reduced.

Because the wheelchairs can be nested in the assembly, they can be jointly returned to a central arrangement point, the advantage being that this can be carried out fast and economically by one or two persons.

In an assembly according to the invention, it is particularly advantageous when it is characterized by the features according to claim 2.

When nesting wheelchairs in an assembly according to the invention, in these embodiments 10%, 25% or 40% or more of space is gained over the unnested wheelchairs.

In an advantageous embodiment, an assembly according to the invention is characterized by the features according to claim 3.

The wedge shape of the wheelchairs, at least in the nested position, provides the advantage that the wheelchairs can be partly slid into each other by, for instance, wheeling the front part of a wheelchair to be nested into the interior space between the frame parts of the preceding wheelchair, which may already be nested. The mutual angle included by the frame parts in the nested position of the wheelchairs and the thickness of the frame parts determine, in this embodiment, inter alia the extent to which the wheelchairs can be slid into each other and hence the extent of nestability.

In a further elaboration, the assembly according to the invention is characterized by the features according to claim 4.

In this embodiment, each of the wheelchairs can be brought into, at any rate more into, the wedge shape by moving the frame parts, so as to enable nesting. In a service position, the wheelchair can then have, for instance, parallel-frame parts. As a result, a wheelchair in such an embodiment has a relatively small track in the service position, while yet a high degree of nestability is possible.

In a further advantageous embodiment, a wheelchair according to the invention is characterized by the features according to claim 7.

The swiveling sitting support provides the possibility of using a simple and comfortable sitting support, which, in a swiveled position, can provide space for nesting another wheelchair in the wheelchair in question. By positioning the swivel pin of the sitting support near the wheelchair's forward end—viewed in the direction of travel—and approximately at right angles to the direction of travel of the wheelchair, the sitting support can be swiveled forwards. A next wheelchair can then be nested from the rear, whereby the sitting support of the next wheelchair can extend at least partly into the space in which the sitting support of the preceding wheelchair would extend in a service position, that is, in the position where it is not swung clear. When nesting a third wheelchair in the rear of the aforementioned next wheelchair, the sitting support of this next, now intermediate, wheelchair is likewise swiveled forwards, in the direction of the swung-away sitting support of the preceding wheelchair, thus providing space for the sitting support of, and hence for the nesting of, the rearmost wheelchair arranged last. In this way, a virtually endless row of wheelchairs can be brought into the nested condition, each, apart from the rearmost wheelchair, with the sitting support in substantially the same, forwardly swiveled position.

By positioning the swivel pin near the back of a sitting portion of the sitting support, a constructionally simple and user-friendly wheelchair with a high degree of nestability is obtained.

Biasing the sitting support into the swiveled position, as described in claim 9, provides the advantage that when the user lifts his or her weight off the sitting support, the sitting support will move to the swiveled position and is directly nestable. When first putting the wheelchair to use, the user will place his or her weight on the sitting support, so that the sitting support will be urged to the service position. Moreover, through a suitable extent of bias, the advantage can be achieved that the movement of the user, as he stands up from a seated posture on the sitting support to an upright position, is at least partly supported by the sitting support. This has ergonomic advantages for the user, who, as a consequence, will moreover be less dependent on helpers. As a user sits down, the sitting support can likewise support the movement at least partly, or at least give the user a sense of guidance. Serviceability and a sense of safety for the user will thus be increased.

In an alternative embodiment, an assembly according to the invention is characterized by the features according to claim 10.

In this embodiment, each wheelchair in the assembly can be provided with at least one fixed sitting support, which is advantageous in terms of construction and pricing. Moreover, no measures need to be taken to prevent parts of the body and the like from being caught between the sitting support and the other parts of the wheelchairs.

In a further advantageous embodiment, an assembly according to the invention is further characterized by the features according to claim 11.

In the use of wheelchairs, it is advantageous when they can be braked, for instance through a brake system acting on the wheels. It is then moreover advantageous if the braking means of a wheelchair brake the wheelchair in a neutral, non-energized position and should be actively set out of the braking position by a user or helper. This prevents the wheelchair, possibly with a user seated therein, from riding off unintendedly, for instance down a slope. In an assembly according to the invention, however, such a construction of the wheelchairs entails the disadvantage that in the nested condition they would all be in the braked position. For that matter, even when the wheelchairs have to be actively set in the braked position, there would be a chance that in a row of nested wheelchairs at least one wheelchair would in fact be in the braked position. This would disenable the joint displacement of the wheelchairs. This disadvantage can be simply obviated by enabling operation of the braking means of all wheelchairs in a row of nested wheelchairs from one of the wheelchairs in the row, while the row of wheelchairs can yet be jointly set in a braked position. 'Joint operation', for that matter, should herein be understood to include a procedure whereby during the nesting of a wheelchair the braking means thereof or of the preceding wheelchair are operated in such a manner that it is brought into the unbraked condition, the arrangement being such that of a row of wheelchairs only one, and preferably the rearmost wheelchair, is braked or can be braked. It is preferred that the braking means of the row of wheelchairs are operable from the rearmost wheelchair in the row because it is well accessible and, moreover, maneuvering the row of wheelchairs is thereby facilitated. The braking means can optionally be securable in the unbraked position.

Further advantageous embodiments of an assembly according to the invention are described in the subclaims.

In the foregoing, a method according to the invention has been described with reference to wheelchairs that are nestable from a rear side. Obviously, however, it is also possible to nest the wheelchairs, for instance, from the front, in which case for instance a possible wedge shape can be of inverted construction, that is, the wheelchair has its largest width at the front.

The invention further relates to a wheelchair evidently suitable for use in an assembly according to the invention.

The invention moreover relates to a method for storing wheelchairs, characterized by the features according to claim 20.

To clarify the invention, exemplary embodiments of an assembly and wheelchair will be described with reference to the drawings, in which.

In this description and these figures, equal or similar parts have equal or similar reference numerals.

Figure 1:
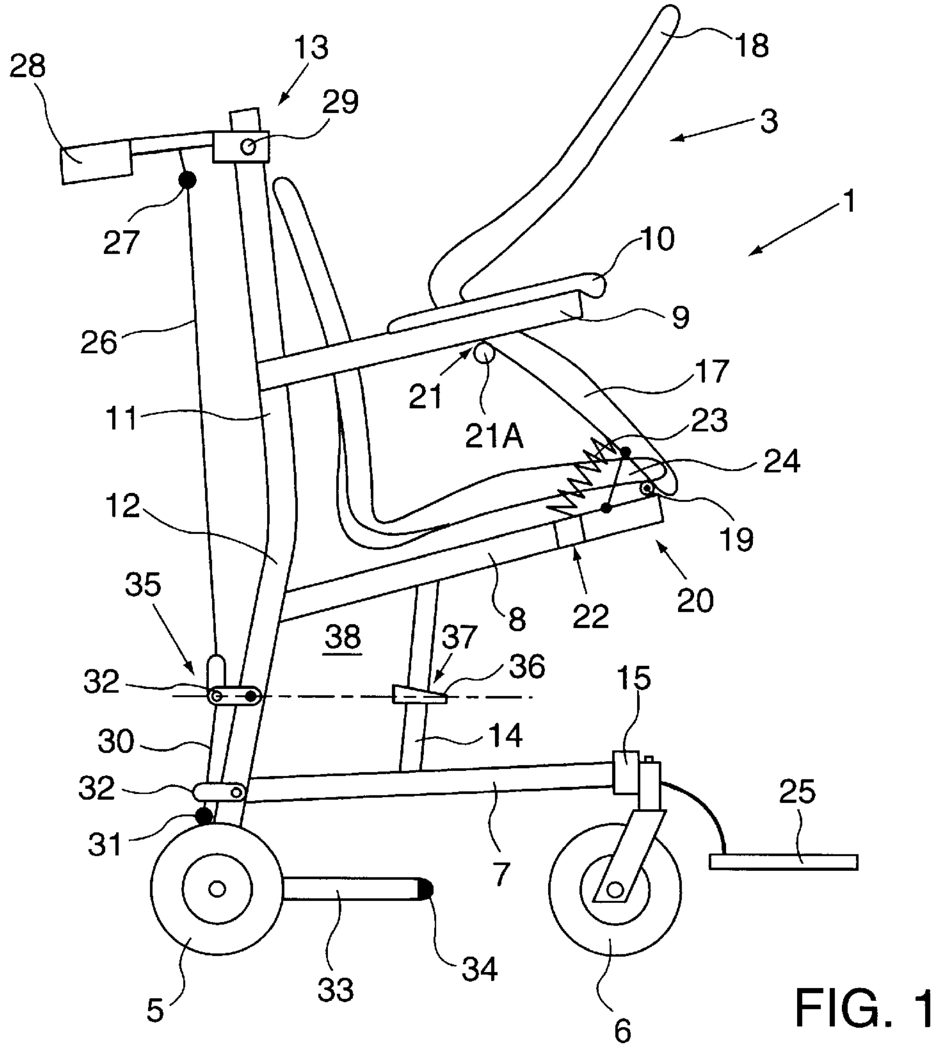
FIG. 1 is a side elevation of a wheelchair according to the invention, in a first embodiment.
Figure 2:
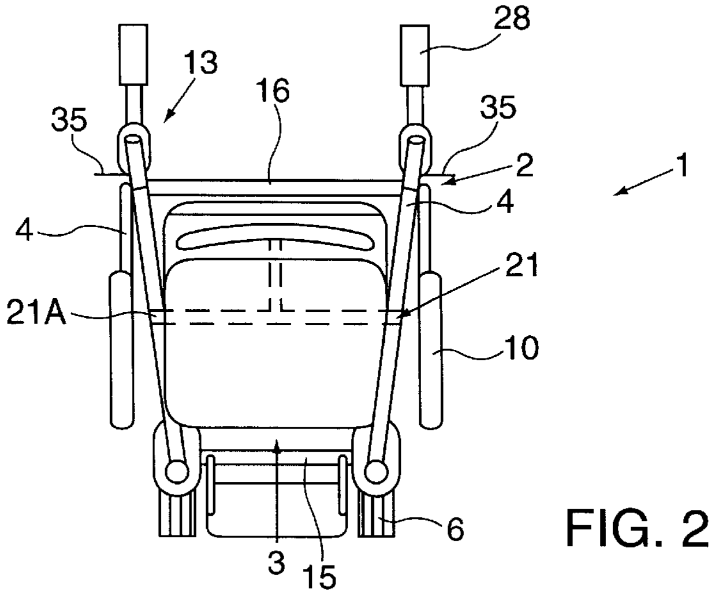
FIG. 2 is a top plan view of a wheelchair according to FIG. 1.

FIGS. 1 and 2 show in side and top plan view an individual wheelchair 1 according to the invention, in unused condition. The wheelchair 1 comprises a frame 2 and a sitting support 3. The frame 2 is made up of two side parts 4, carried by two rear wheels 5, which are not steerable, and two steerable front wheels 6. All wheels have the same size.

Each side part 4 of the frame 2 comprises a lower, first tube 7, extending approximately horizontally, an intermediate, second tube 8, to some extent slanting upwards in the direction of the front of the wheelchair 1, and a third tube 9, extending approximately parallel to the second tube 8, which forms an arm support and to that end is provided with an armrest 10. The third tube is shorter than the first 7 and second tube 8. The first 7 and second tube 8 are not mutually connected at the front. At the rear, the first 7 and second tube 8 are mutually connected by a rear, approximately vertical tube 12 which extends beyond the height of the second tube 8 and the third tube 9 and is provided at the upper end with a grip support 13. At a point between the second 8 and the third tube 9, the rear tube 12 is provided with a bend 11, in such a manner that the upper part of the rear tube slants backwards to some extent. The grip support 13 will be further discussed hereinafter. The third tube 9 with armrest 10 is carried by the rear tube 12. Extending approximately vertically between the first 7 and second tube 8, at some distance from the rear tube 12, is a central tube 14, which substantially supports the second tube 8 and hence the sitting support 3, as will be further explained hereinafter.

Each side part 4 extends substantially in a vertical plane. The two side parts 4 are mutually connected by a first cross connection 15 adjacent the forward ends of the first tube 7 and by a second cross connection 16 between the rear tubes 12, at a height between the first 7 and the second tube B. The frame 2 of the wheelchair 1 is not collapsible and has such dimensions that it cannot, unless with great effort, be transported in a normal passenger car. A 'normal passenger car' is understood to include at least a sedan and a hatchback model, and 'in the passenger car' is understood to refer to a passenger car with the doors and any loading doors closed.

The sitting support 3 is formed by a bucket seat, made of plastic, comprising a seat 17 and a backrest 18 formed integrally therewith, or at least fixedly attached thereto. On its underside, at the front thereof, the seat 17 is hingedly connected to the forward ends 20 of the second tubes 8 via two hinge points 19. As a result, the seat support 3 can be swiveled forwards. In FIG. 1 the sitting support in a forwardly swiveled position is represented in solid, full lines, while the sitting support in the service position is represented in broken lines. Arranged under the sitting support 3 is a supporting frame 21. This supporting frame 21 is provided, adjacent the rear of the sitting support 3, with a cross-rod 21A, which extends beyond the sides of the seat 17 and can abut against the upper side of the second tubes 8, for supporting the sitting support 3 in the service position. At the underside, between the second tubes 8 of the two frame parts 4 and at some distance from the forward ends 20, a third cross connection 22 is provided. Included between the supporting frame 21 and the third cross connection 22 is a spring device 23 which biases the sitting support 3 in the forwardly swiveled position. In unloaded condition the sitting support 3 is therefore always in the forwardly tilted position. Additionally, between the supporting frame 21 and the third cross connection 22 a cable or chain 24 is included, which has a length such that the sitting support 3 cannot swivel further than the forwardly tilted position shown in FIG. 1. Obviously, the resilient means and the means limiting the swiveling movement can also be constructed in other ways.

Arranged at the front of the first tubes 7 are two footrests 25. Included behind the rear tubes 12 is a brake rod 26, which is connected at the top with a grip 28 via a first swivel bearing 27, which grip 28 is connected with the grip support 13 described earlier via a second swivel bearing 29. The first swivel bearing 27 is spaced from the second swivel bearing 29, so that upon a tilting movement of the grip 28 in approximately the vertical plane, the brake rod 26 is likewise moved in vertical direction. The lower end of the brake rod 26 is pivotally connected with a brake bracket 30, which is movable in the longitudinal direction parallel to the rear tube 12 under the influence of the aforementioned movement of the brake rod 26 in the vertical plane. At the underside of the brake bracket a brake block 31 is included, extending outwards at right angles to the longitudinal direction of the brake bracket 30. The brake bracket 30, and hence the brake block 31, is biased in downward direction by a spring element, not shown in the drawing, for instance a torsion or compression spring. Guide brackets 32 ensure that the brake bracket 30 always moves along the rear side of the rear tube 12. In a rest position, the brake block 31, owing to the downward bias thereof, is pressed against the tread of a rear wheel 5. As a result, the wheelchair 1 is braked. A brake assembly as described above can, for that matter, be arranged on one as well as on both sides of the wheelchair 1. If the wheelchair 1 is to be moved, for instance when a user has sat down on the sitting support, the or each grip is swiveled upwards, so that the brake rod 26 is moved up along with it. The resultant vertical, upwardly directed movement of the or each brake bracket 30 draws the or each brake block 31 off the wheel 5 in question, so that the wheelchair can be moved. If the or each grip 28 is released, the wheelchair 1 is braked again.

Figure 3:
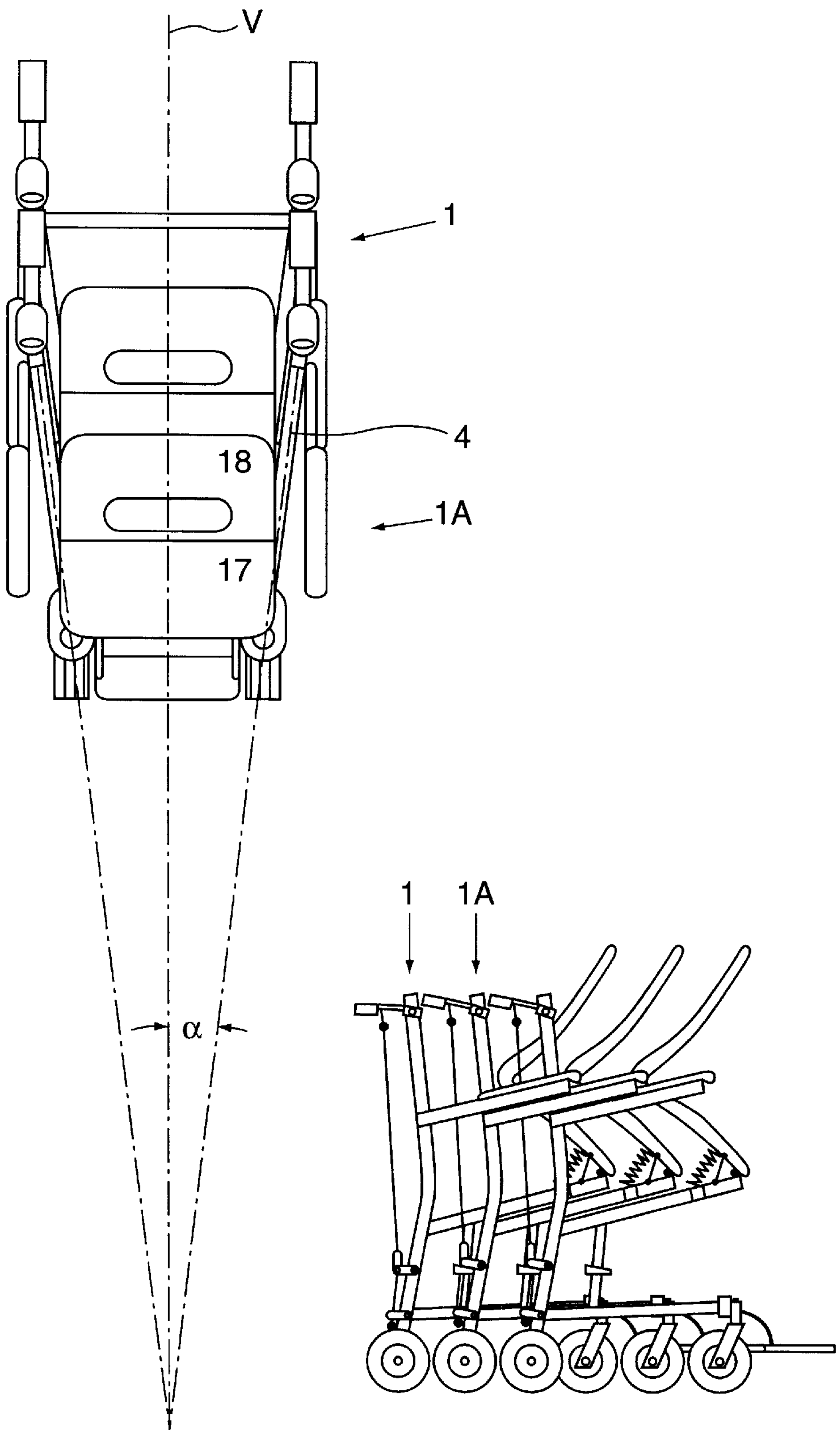
FIG. 3 is a side and top plan view of a row of wheelchairs according to FIGS. 1 and 2, in nested condition.

A wheelchair 1 as described in the foregoing is nestable with a similar wheelchair 1, as represented in FIG. 3. To that end, a wheelchair 1 is wheeled, with its front first, from behind into the space between the frame parts 4 of a preceding wheelchair 1A, with the sitting support 3 of at least the preceding wheelchair 1A in unloaded condition. In order to enable the rearmost wheelchair 1 to be wheeled in, the two frame parts 4 of the wheelchairs 1, 1A are arranged at an angle a relative to the longitudinal median plane V of the wheelchairs. Accordingly, the vertical projection of the wheelchair 1 is trapezoidal or wedged, with the short side of the trapezoid directed forwards. The angle $\alpha$ is so chosen that the rearmost wheelchair 1 can be moved over approximately two-thirds of its length between the frame parts 4 of the preceding wheelchair 1A, the front wheels 6 of the rearmost wheelchair 1 then almost touching the front wheels 6 of the preceding wheelchair 1A. The front wheels of both the preceding wheelchair 1A and the rearmost wheelchair 1 therefore remain capable of swiveling. The angle which the third tube 9 includes with the horizontal is then chosen such that the armrest of a preceding wheelchair 1A can extend simply and freely under the third tube 9 of the rearmost wheelchair 1.

In order to prevent the wheelchairs 1, 1A being moved too far under and into each other and thereby sustaining damage, a stop tube 33 extending approximately horizontally and parallel to the longitudinal median plane V is arranged adjacent the lower end of at least one rear tube 12. This stop tube 33 has a length approximately corresponding with the length of the wheelchair, less the length over which the wheelchairs 1, 1A can be moved into and under each other, that is, are nestable. At the front the stop tube 33 is preferably provided with a plastic or rubber stop boss 34. In the nested condition of the wheelchairs 1, 1A, the stop boss 34 abuts against, for instance, the rear side of the lower end of the rear tube 12 of a preceding wheelchair 1A. The wheelchairs 1, 1A then preferably do not make any further contact with each other.

As is clear from the drawing and the description, the wheelchairs in the nested condition occupy much less space, in particular floor space, than in unnested condition. Depending on inter alia the size of the wheels and the relative position thereof, this saving can be, for instance, 10%, with the distance over which the wheelchairs 1, 1A can be moved into and under each other being approximately 20% of the length of the wheelchairs The saving can also be, for instance, 40%, with the wheelchairs being adapted to be moved into or under each other over a distance amounting to 80% of the length of the wheelchairs. In selecting the dimensions and the extent of nestability of the wheelchairs, a suitable compromise between riding convenience and nestability can be opted for, for instance through an appropriate choice of the wheel size.

As will be clear from FIG. 3 in particular, the necessary space for nesting the wheelchairs 1 is provided by, on the one hand, the trapezoidal shape of the wheelchair in top plan view and, on the other, by the sitting supports swiveling forwards in unloaded condition. The sitting support 3 being biased into the forwardly swiveled position moreover provides the advantage that during use of the wheelchair, in particular also during at least a part of the movement of a user sitting down in or getting up from the wheelchair, the user is optimally supported. Indeed, when getting up from the wheelchair, the user will be supported to some extent in his or her movement, and conversely, when sitting down, the user will be braked to some extent, so that he or she will not fall into the sitting support. Between the sitting support 3 in the service position and the frame 2, such an amount of space is left-clear on all sides that a user or attendant when using the wheelchair 1 cannot have his or her fingers or other parts of the body caught in a painful manner.

In order to ensure that the wheelchairs 1 remain mobile also in nested condition, provisions have been made for centrally setting the nested wheelchairs "off the brake". That is to say that through releasing operation of the braking means of one of the wheelchairs, being the rearmost wheelchair 1 in the example shown, all wheelchairs are mobile. These provisions are built up, for instance, as follows.

The brake bracket 30 is provided with a run-on pin 35 extending inwards, at right angles to the longitudinal direction of the adjacent rear tube 12. Attached to the central tube 14 is a run-on cam 36, of which an upper edge 37 slopes down in forward direction. During the nesting of the wheelchairs 1, 1A, the run-on cam 36 of the rearmost wheelchair 1 butts, through its upper edge 37, against the underside of the run-on pin 35 of the preceding wheelchair 1A, where the or each brake block 31 bears on a rear wheel 5. Upon further forward movement of the rearmost wheelchair 1, the run-on pin 35 is moved up along the upper edge 37 of the run-on cam 36, while carrying along the or each brake bracket 30 and hence the or each brake block 31. As a result, when placing a wheelchair behind another wheelchair, the preceding wheelchair is set "off the brake". In this manner it is ensured that at least during the forward movement of the wheelchairs, by pressing on the rearmost one, the preceding wheelchairs are always "off the brake", and hence are displaceable along with the rearmost one. Obviously, all kinds of other provisions can be made for centrally setting the wheelchairs off the brake in a nested condition.

In an alternative embodiment, not shown, during the nesting of the wheelchairs, a preceding wheelchair 1A is lifted somewhat at the rear side thereof by the next wheelchair 1 being nested, in such a manner that the rear wheels of the former are lifted off the ground. As a consequence, the brake blocks need not be dislodged from the wheels, except in the rearmost wheelchair. This lift of the rear side of the wheelchair can be obtained, for instance, by run-on cams, for instance at the front of the stop tubes 33.

The rear tube 12, the central tube 14, the first tube 7 and the second tube 8 enclose a rectangle, which is closed by a board 38. This board can be used, for instance, for advertising purposes or it could indicate the origin and other identification means.

Figure 4:
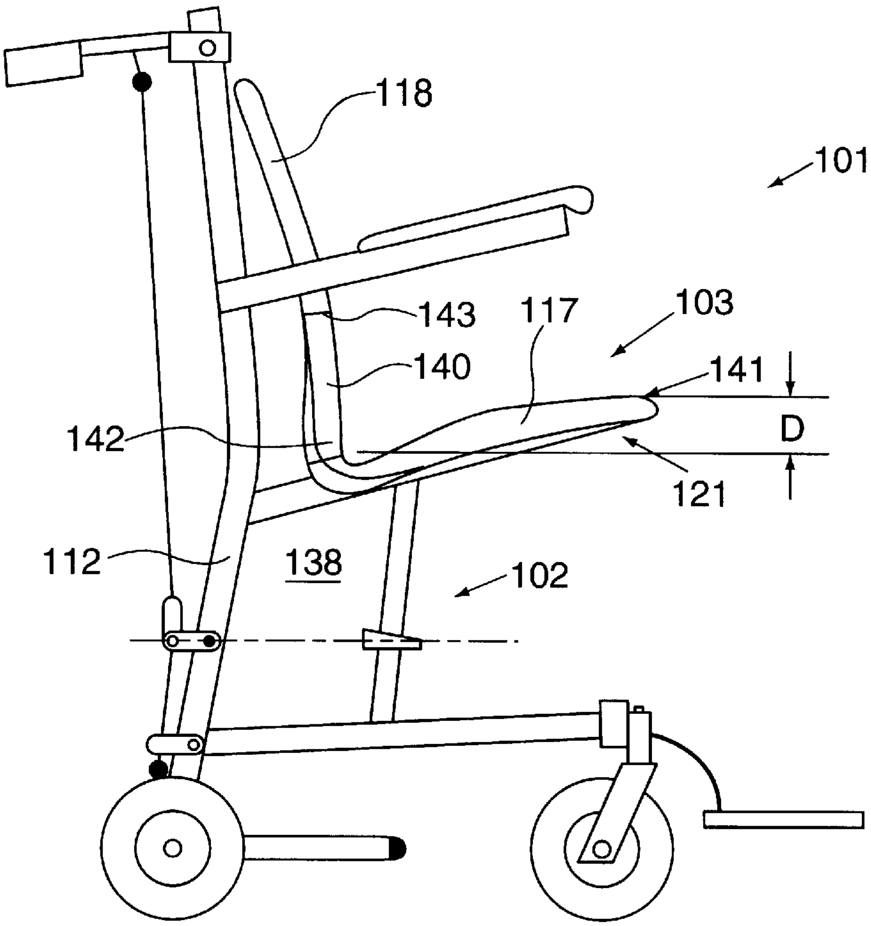
FIG. 4 is a side elevation of a wheelchair according to the invention, in a second embodiment.
Figure 5:
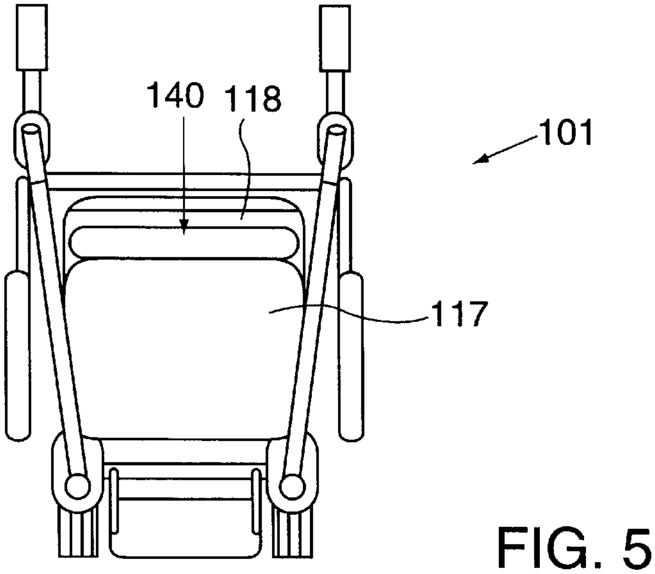
FIG. 5 is a top plan view of a wheelchair according to FIG. 4.

FIGS. 4 and 5 show in side and top plan view an alternative embodiment of a wheelchair according to the invention. Insofar as the wheelchair is the same as the wheelchair described earlier, the same reference numerals will be used, increased by a hundred, and for a better understanding reference is made to the description given earlier.

In a wheelchair 101 in this embodiment the sitting support 103 is fixedly mounted on the frame 102, for instance via the supporting frame 121. The frame 102 is the same as the frame 2 of the wheelchair 1 described earlier.

The sitting support 103 comprises a seat 117 and a backrest 118 mounted independently thereof, fitted, for instance, against the rear tubes 112. Between the seat 117 and the lower edge 143 of the backrest 118 an opening 140 is left clear, with a purpose to be further described hereinafter. The seat 117 slopes down in rearward direction, in such a manner that the underside of the front edge 141 of the seat 117 is situated a distance D higher than the upper side of the rear edge 142 of the seat 117. The lower edge 143 of the backrest 118 is situated higher than the upper side of the front edge 141 of the seat 117. The width of the opening 140 is greater than the width of at least the front portion of the seat 117.

Figure 6:
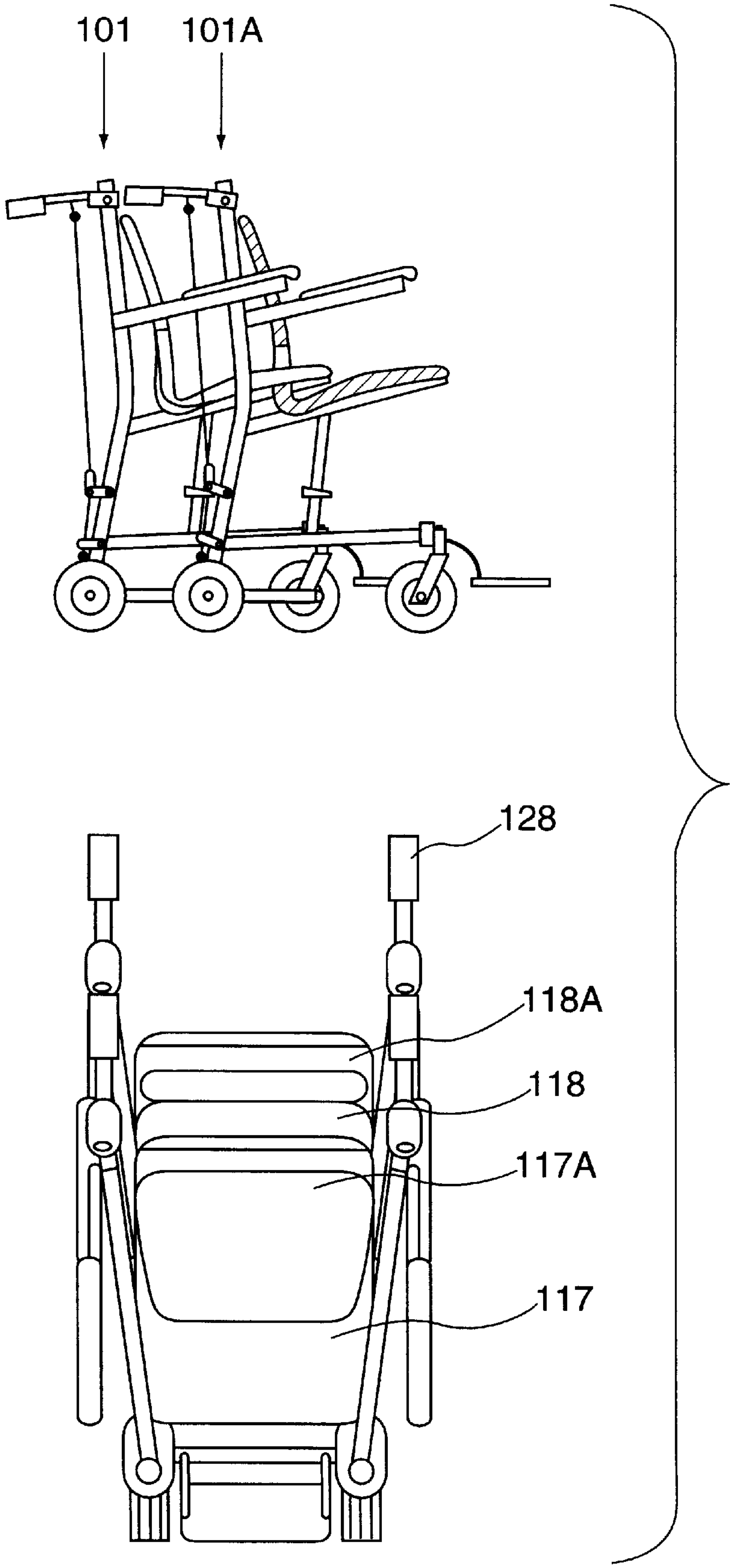
FIG. 6 is a top and side view of a row of wheelchairs according to FIGS. 4 and 5, in nested condition.

When nesting the wheelchairs 101, 101A, as shown in FIG. 6, the front portion of the seat 117 of the rear wheelchair 101 is moved through the opening 140 in the sitting support 103 of the front wheelchair 101A, above the seat 117 thereof. As a consequence of the suitably chosen inclination of the seats 117, the underside of the front edge 141 of the seat 117 of the rear wheelchair 101 remains clear of the seat 117 of the front wheelchair 101A, while the wheelchairs are yet nestable to a relatively large extent. The angle of the seat and the thickness of the seat and the supporting frame arranged thereunder can be chosen such that a high degree of nestability is obtained, while yet a comfortable sitting support is maintained. Such a fixed sitting support 103 provides constructional advantages over a movable sitting support.

Figure 7:
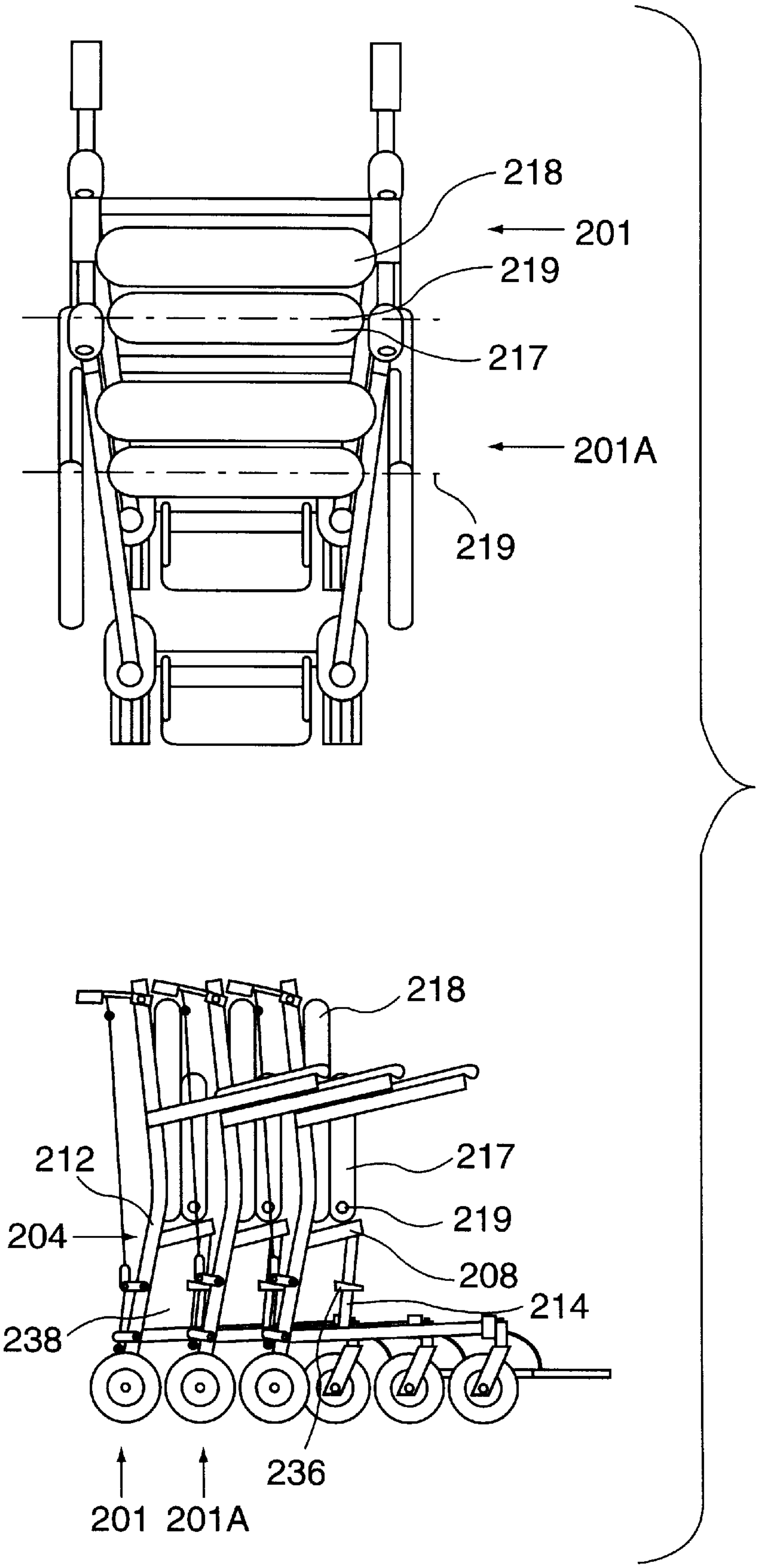
FIG. 7 is a top and side elevation of a row of wheelchairs according to the invention, in a third embodiment.

FIG. 7 shows a series of nested wheelchairs 201, 201A according to the invention, in an alternative, advantageous embodiment. In this embodiment the backrest 218 of the wheelchair is fixedly connected to the frame 204, in particular the rear tubes 212 thereof, while the seat 217 is foldable into an approximately vertical position, in such a manner that the seat 217 and the backrest 218 are approximately in mutual abutment. To that end, the seat 217 is connected at the rear side with the frame 204 via a swivel pin 219 which extends horizontally at right angles to the direction of travel of the wheelchair 201. The swivel pin 219 is biased into a position such that the seat 217 in unloaded condition is urged into the upwardly folded position. To that end, for instance a torsion spring, not shown, is arranged. Additionally, the swivel pin 219 is so designed that the seat is at least substantially carried by it in both loaded and unloaded position. Owing to the swivel pin 219 being arranged adjacent the rear side of the seat 217, the second tubes 208 can be made of relatively short design, for instance up to the upper side of the central tube 214. This central tube 214 then has no or substantially no bearing function and is substantially intended for carrying the run-on cam 236 and optionally for enclosing the board 238.

If the-swivel pin 219 has sufficient bearing force to independently bear the seat 217, the central tube can be omitted entirely or partly, and the run-on cam 236 can be arranged at a different position, for instance on the rear tubes 212. Moreover, it is obvious that a mechanism for setting the wheelchairs jointly "off the brake" can be applied in a different manner. The wheelchair 201 in this embodiment has the advantage that a particularly simple construction is obtained with a particularly high degree of nestability. The limiting factor of this nestability is then formed only by the size of the (rear) wheels and/or the thickness of the seat. Thus, such a wheelchair, when using wheels with a diameter of 20 cm, can be simply designed in such a manner that in the nested condition the rear wheelchair 201 projects rearwardly from the front wheelchair 201A by, for instance, 20 cm. Thus five wheelchairs can be nested on a floor area of a length approximately equal to one meter plus the length of three front wheels in line; 140 cm. A loose wheelchair then has a length of about 60 cm, which means that a row of five loose wheelchairs would occupy a length of about 300 cm. Moreover, for a wheelchair according to the invention, substantially standard parts can be used.

At the rear, the wheelchair can be provided with an inclining part, not belonging to the seat, against which the front edge of the seat of the rear wheelchair butts during nesting, in such a manner that the seat is automatically urged in the upwardly swiveled position. In such an embodiment the biasing spring can be omitted or at least be designed to be less strong. The seat, upon unnesting of the wheelchairs, falls back into the service position under the influence of gravity.

Obviously, the seat can also be adapted to be swung clear in other directions, for instance about a swivel pin located along the front edge, similar to the swivel pin 19 in FIG. 1, or about a swivel pin adjacent the middle or along a side of the seat. Further, for moving the seat, four-bar mechanisms can be used.

In the foregoing, a frame 3, 103 has been described, with the two frame parts 4, 104 in a fixed position relative to each other. It is also possible, however, to adapt the two frame parts 4, 104 for some degree of swiveling movement, in such a manner that in a service position they extend approximately parallel to each other and to the longitudinal median plane, while in a nested condition the trapezoidal shape is assumed. Here the swiveling movement of the sitting support towards the forwardly tilted position can be initialized by the movements of the frame parts 4. In such an embodiment, during normal use a relatively compact frame construction is obtained, with a rectangular basic shape, while the wheelchairs are yet nestable.

Figure 9:
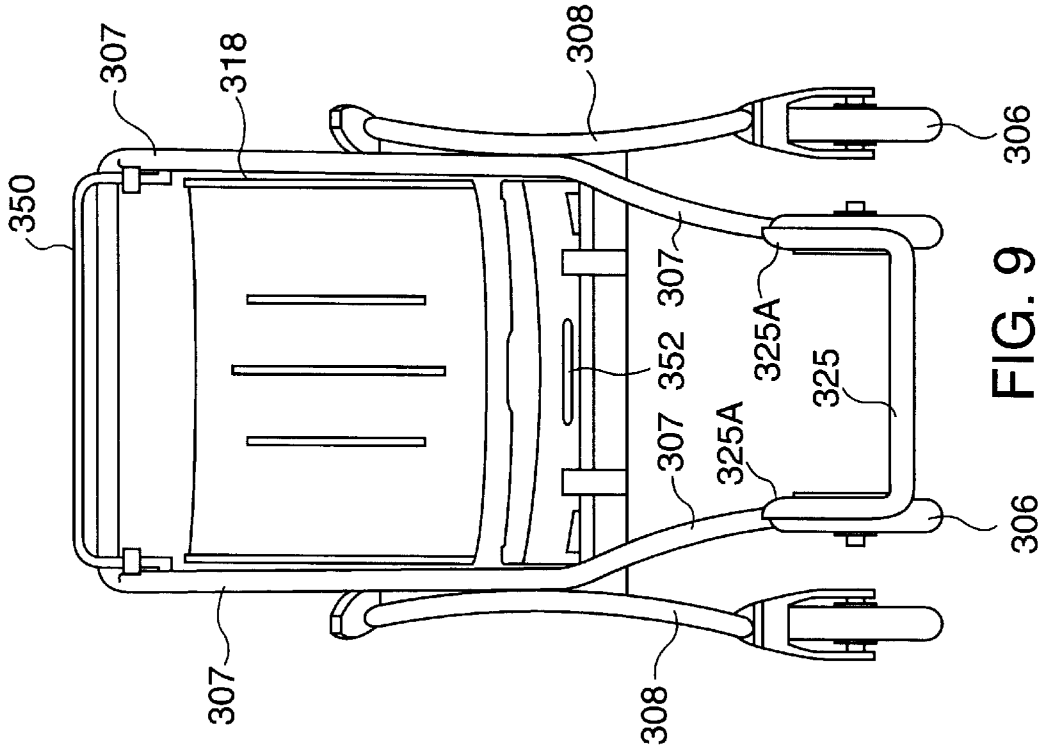
FIG. 9 is a front view of a wheelchair according to FIG. 8.
Figure 8:
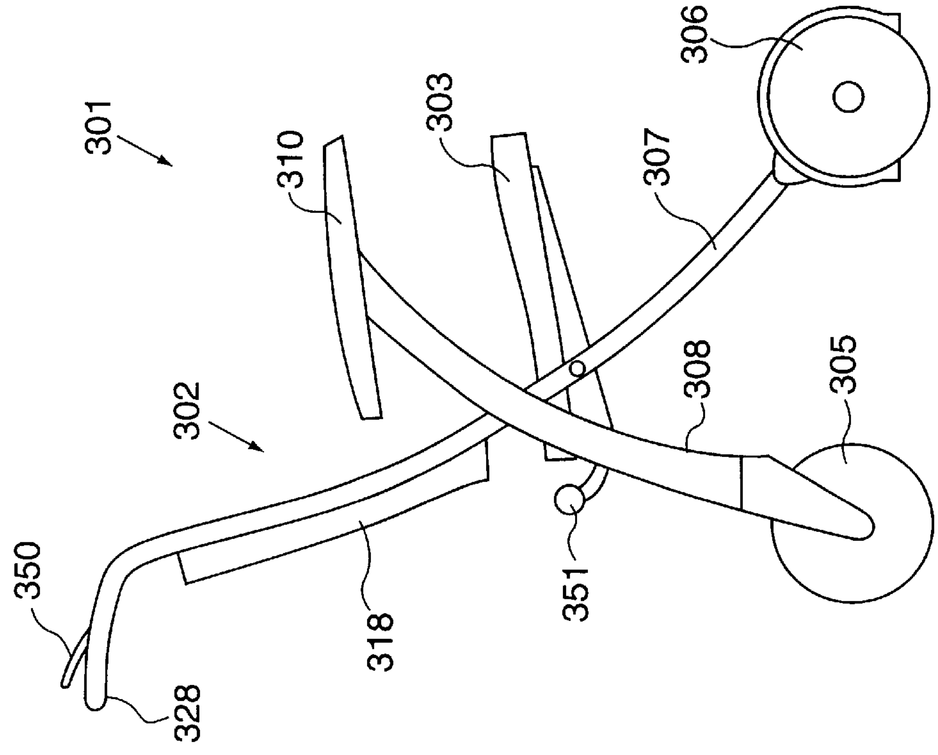
FIG. 8 is a side elevation of a wheelchair according to the invention in a fourth embodiment.
Figure 10:
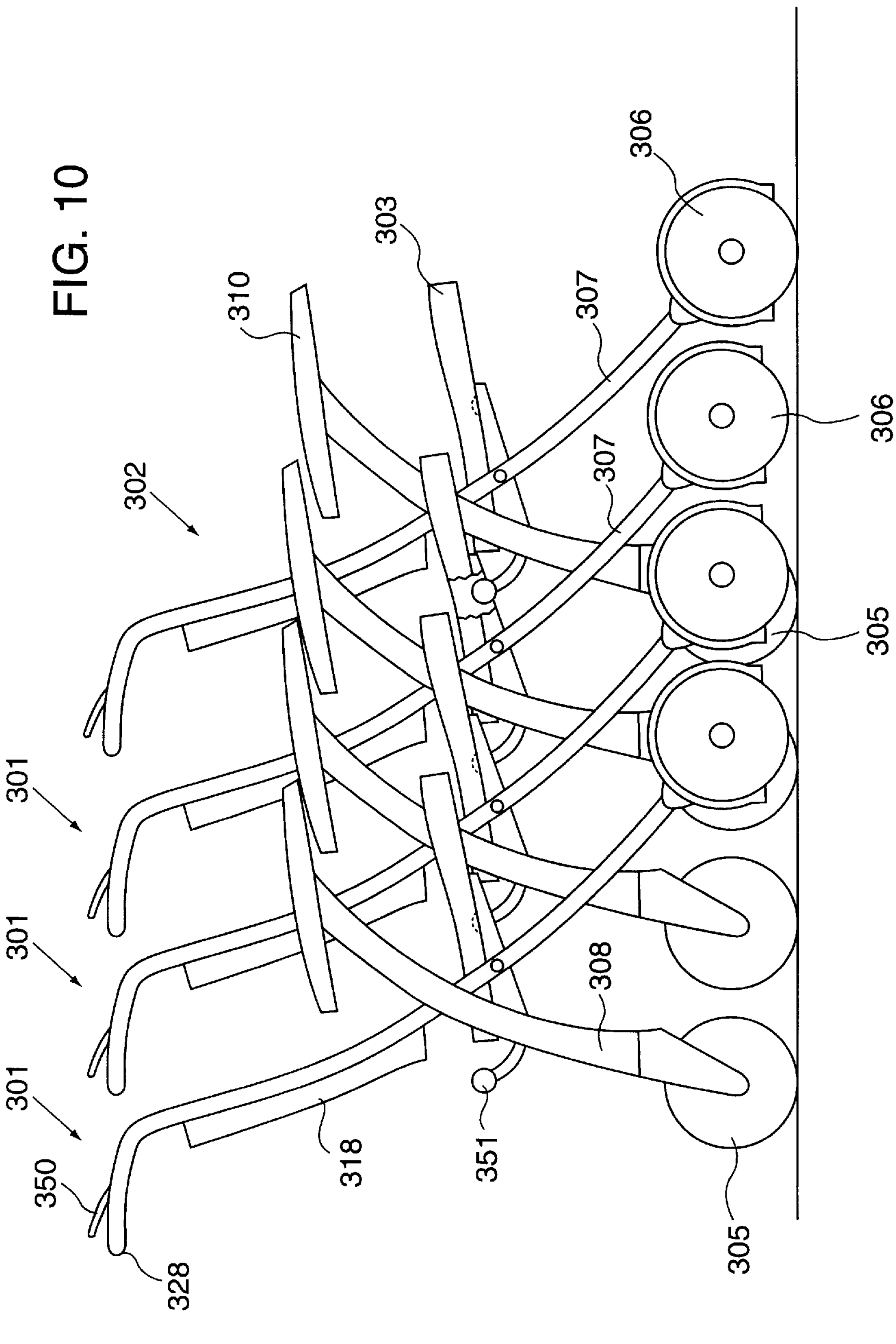
FIG. 10 is a side elevation of a series of wheelchairs according to FIGS. 8 and 9.

FIGS. 8–10 show a fourth embodiment of a nestable wheelchair according to the invention, separately and in nested condition. In this embodiment, which to some extent is similar to a wheelchair according to FIG. 4 in particular, the wheelchair 301 comprises a cross frame 302, a sitting support 303 and a backrest 318. The cross frame 302 comprises, on opposite sides of the seat 303 and the backrest 318, a first frame tube 307, which extends from a fixed front wheel 306 as far as a push rod 328 connecting the two first frame tubes 307 at the top thereof. The cross frame 302 further comprises, likewise on opposite sides of the seat 303 and the backrest 318, a second frame tube 308, which extends from a steered rear wheel 305 as far as an armrest 310 fitted on the upper side of the corresponding second frame tube 308. The seat 303 is carried by the first frame tube 307 and the second frame tube 308 at an inclination $\alpha$, in such a manner that the front edge of a wheelchair 301 as shown in FIG. 10 can be moved above the sitting surface of the seat 303 of a preceding wheelchair 301, while the armrest 310 of the wheelchair extends partly above the armrest 310 of the preceding wheelchair and the front wheels 306 of the wheelchair are accommodated under the seat 303 of the preceding wheelchair and to that end have been moved between and past the rear wheels of the preceding wheelchair.

The two non-steerable front wheels 306 are mutually connected through a footrest 325 which is integrated with two mudguard-like parts 325*a* which screen the side of the front wheels 306 proximal to the user's feet during use. The push bar 328 connecting the upper ends of the first frame tubes 307 has been shifted slightly towards the rear relative to the backrest 318. Extending along the push bar 328 is a brake handle 350 which is pivotally connected to the upper ends of the first frame tubes 307. Through the first frame tubes 307 extends a brake cable from the brake handle 350 as far as braking means, not shown in the drawing, arranged adjacent is the front wheels 306. Accordingly, by tilting the brake rod 350 the front wheels 306 can be braked and be released, Extending rearwards from the rear edge of the seat 303 is a lift knob 351, which is so located that when a wheelchair 301 is being nested from the rear into a preceding wheelchair 301, the underside of the seat rises along the lift knob 351, whereby the lift knob 351, in the nested condition, is partly received in a recess 352 provided under the seat 303 and the front wheels 306 of the rear wheelchair 301 are lifted slightly off the floor. As a result, the wheelchairs can be moved together, also when the front wheels of rear wheelchairs are braked.

A wheelchair 301 according to FIGS. 8–10 has the advantage that it is simple to manufacture, has an attractive appearance, exhibits good maneuverability and moreover is safe in use. Viewed in side elevation, the braked front wheels 306 are located forward of the front edge of the seat 303. Owing to the footrest 325 being included between the non-steered front wheels 306, a user can bring to bear at least a part of his weight on the footrest 325 without the wheelchair thereby tilting, even when the user will stand up substantially straight. This means that stepping into and out of the wheelchair does not entail the risk of the user falling over along with the wheelchair. Obviously, such an arrangement of the footrest can also be opted for with other wheelchairs according to the invention. In addition, in the other embodiments too, it is possible for the front wheels to be of non-steerable design and for the rear wheels to be of steerable design, and furthermore all wheels can be made of steerable design.

By way of illustration, a number of measurements of a nestable wheelchair according to the invention are given, which measurements should not interpreted as being limitative. A wheelchair according to FIG. 8, for instance, has a wheelbase of 510 mm, a seat height of 530 mm at the front edge and 460 mm at the rear edge, the inclination of the seat being about 10° on average. The backrest has a lower edge at 540 mm from the ground and an upper edge at about 900 mm from the ground. The distance between the axles of the rear wheels of two mutually nested wheelchairs is about 230 mm, while the front and rear wheels have a diameter of about 200 mm. This means that two unnested wheelchairs arranged one behind the other occupy a floor area approximately 1420 mm in length, while the same wheelchairs in nested condition occupy a floor length of about 940 mm, a saving of about 30%. The use of smaller wheels and a greater inclination and/or lesser thickness of the seat can lead to a greater saving on the floor area needed.

Obviously, where desired, features described earlier can be used in a wheelchair according to FIGS. 8–10.

In an advantageous embodiment, at least a number of wheelchairs are designed in sizes for pre-school children, infants or possibly babies. This is advantageous in particular when they are used in department stores and the like. Such wheelchairs can be hired out or lent out as buggies, so that people with little children are not dependent on buggies and the like which they have brought along, while the personnel need not collapse and unfold the buggies every time. Such wheelchair buggies according to the invention are therefore more robust and handier in use.

An assembly of a series of wheelchairs according to the invention can be used as follows, assuming, by way of example, the context of a hospital.

A patient arrives at a hospital hall, where a series of wheelchairs are arranged in nested condition near the entrance. The rearmost wheelchair 1, 101 is moved backwards from the row by an attendant by gripping and moving up the grips 28, 128, while simultaneously wheeling the wheelchair 1, 101 backwards. Then the patient can sit down on the sitting support, whereby, at least in the wheelchairs shown in FIGS. 1–3, the sitting support 3, 103 is urged to the service position. Having arrived at a destination, at any rate after use, the wheelchair 1, 101 can be left behind, for use by others. In the inoperative position the wheelchair is automatically braked. At the end of the day, or so much earlier as desired, a person appointed for that purpose can collect the various wheelchairs which have become spread through the hospital, and return them to the arrangement point near the entrance. To that end, each time he or she finds a wheelchair unattended, he or she can nest it in the series of wheelchairs already collected, the collector only needing to operate the braking means of the rearmost wheelchair for him to bring the entire series of wheelchairs in nested condition back to the entrance, ready for subsequent use, without any assistance from others. Owing to the wheelchairs being uncollapsible, they cannot be readily carried off by the users. For that matter, anti-theft attachments such as alarm devices and the like can be included, as can locking means preventing use. The wheelchairs according to the invention therefore have the advantage that they occupy little space in a storage position and yet are convenient in use, notably in that they need not be set up or unfolded for use, while moreover collecting the wheelchairs can be carried out fast and efficiently by a single person.

When using an assembly in places where the wheelchairs are also intended for outside use, as for instance at airports and railway stations or nursing homes, hospitals or rehabilitation institutions with an outdoor space such as a garden or parking lot, it is preferred that means are provided for the covered and optionally secured arrangement of the wheelchairs, an embodiment with a tiltable sitting support moreover enjoying the advantage that it prevents precipitation being left on the seat. In a wheelchair according to the invention, it may be an advantage for the wheelchair to have an appearance that is little attractive, in any case for private use, since this considerably reduces the risk of such a wheelchair being stolen.

Obviously, the other wheelchairs shown and other wheelchairs according to the invention can be used in a similar manner.

Analogously to the foregoing description, an assembly of wheelchairs can also be designed for nesting from the front. In that case, the wedge shape shown can be mirrored with respect to a plane at right angles to the direction of travel, in such a manner that the wheelchair has the largest width at the front. The seat can then be adapted, for instance, to swing clear in rearward direction, optionally as shown in FIG. 7, and with a footrest capable of swinging clear.

The invention is not in any way limited to the embodiments shown in the drawings and described in the description. Many variations thereof are possible.

Thus, for instance, only three wheels may be provided, and the frame may be built up differently, for instance wholly or partly from plate elements or the like. Obviously, other sitting supports can be used, in which case the entire sitting support or a portion thereof can be differently designed to swing clear or be removable. The seat can be adapted to swing clear forwardly or laterally, while the backrest may or may not be fixedly arranged. Further, the wheelchairs can be so designed that the wheelchairs described in the foregoing can be combined into one assembly of nestable wheelchairs. Obviously, the wheelchairs, in addition to being nestable, can also be wholly or partly collapsible or detachable, while moreover all kinds of accessories can be arranged, such as a headrest or neck support, driving means and the like. The braking means can be designed differently, for instance as rim or drum brakes. Further, the bias of the sitting support of the wheelchair into the forwardly swiveled position can be obtained differently or be omitted.

These and many similar adaptations and variations are understood to fall within the scope of the invention.

What is claimed is:

1. An assembly of at least two wheelchairs, each provided with at least three wheels, a frame and a sitting support, whereby the wheelchairs are nestable in such a manner that the wheelchairs in a nested condition occupy considerably less space than in unnested condition, whereby in the nested position, seen in a vertical direction, the sitting support of a first nested wheelchair at least partly extends inside the contours of the space which would be occupied by the sitting support of a second wheelchair nested in front of or behind said first wheelchair when the sitting support of said second wheelchair were in a position ready for use, characterized in that the sitting support is permanently connected to the frame by a swivel device, the swivel device connected near the front of a sitting portion of the sitting support, said swivel device is in essentially the same position when the wheelchair is in a nested position or in an unnested position, such that the wheelchairs upon being unnested are at least in essence directly ready for use.

2. An assembly according to claim 1, characterized in that in the wheelchairs in nested condition the sitting support of a wheelchair nested in front extends at least partly above or under the sitting support of a wheelchair nested therewith from behind.

3. An assembly according to claim 1, characterized in that the frame of each wheelchair comprises at least two side parts which, at least partly, laterally define an interspace under the sitting support, while the frame at least in the nested condition is slightly wedge-shaped in top plan view, in such a manner that a portion of a wheelchair is receivable in the interspace of the front or rear wheelchair.

4. An assembly according to claim 1, characterized in that each sitting support is at least partly adapted to swivel about a swivel pin extending substantially horizontally, between a service position and a nested position, in order to provide space, in the nested position of the wheelchairs, for nesting a next wheelchair.

5. An assembly according to claim 1, characterized in that each wheelchair is provided with braking means which act on at least one of the wheels thereof, which braking means, with the wheelchairs in nested position, are centrally operable from one of the wheelchairs of the row of nested wheelchairs.

6. An assembly according to claim 1, characterized in that each wheelchair is provided with braking means acting on at least one of the wheels, while in the nested position of the wheelchairs the or each braked wheel is lifted slightly off the ground, except in one wheelchair, preferably the rearmost wheelchair or at any rate for the wheelchair nested last.

7. An assembly according to claim 1, characterized in that each of the wheelchairs is non-collapsible.

8. An assembly according to claim 1, characterized in that the sitting support of each of the wheelchairs is formed by a bucket-shaped element which comprises at least a sitting portion and a back portion.

9. An assembly according to claim 1, characterized in that each of the wheelchairs is provided with armrests which, with the wheelchairs in the nested position, extend at least partly above or under the armrests of the preceding or following wheelchair.

10. An assembly according to claim 1, characterized in that two front wheels are provided with a fixed direction of travel, which front wheels can be braked; while the or each rear wheel is steerable, a footrest being provided which is included substantially between the front wheels and during use, viewed in side elevation, extends at least partly before the front edge of the sitting support.

11. A wheelchair having the features of a wheelchair used in an assembly according to claim 1.

12. An assembly according to claim 3, characterized in that each sitting support comprises a substantially fixedly arranged sitting portion which has an inclination and a construction chosen such that in a nested position the sitting portion of a rear wheelchair extends, at least by a portion thereof, above a rear portion of the sitting portion of a front wheelchair.

13. An assembly according to claim 4, characterized in that the swivel pin extends transversely to the normal direction of travel of the wheelchair in question, adjacent the front edge of the sitting portion of the sitting support.

14. An assembly according to claim 4, characterized in that the swivel pin extends approximately transversely to the direction of the travel of the wheelchair in question, adjacent the rear edge of the sitting portion of the sitting support.

15. An assembly according to claim 4, characterized in that each sitting support or at least the sitting portion thereof is biased in the direction of the nested position.

16. An assembly according to claim 5, characterized in that the braking means of each wheelchair comprise a brake rod for operating the braking means, each brake rod being connected with a run-on element, the run-on elements being so arranged that during the nesting of two wheelchairs the brake rod of one of the wheelchairs is operated in such a manner that in the row of nested wheelchairs the braking means of all wheelchairs are released, with the exception of the braking means of one of the wheelchairs, the arrangement being such that upon release of the braking means of the relevant, wheelchair the entire row of wheelchairs can be displaced in nested condition.

17. A wheelchair according to claim 11, characterized in that the wheelchair is adapted to children's or pre-schoolers' sizes.

* * * * *